(12) United States Patent
Ota et al.

(10) Patent No.: US 12,168,948 B2
(45) Date of Patent: Dec. 17, 2024

(54) INDUSTRIAL VEHICLE

(71) Applicant: KABUSHIKI KAISHA TOYOTA JIDOSHOKKI, Kariya (JP)

(72) Inventors: Yuhei Ota, Kariya (JP); Hidehito Kondo, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 335 days.

(21) Appl. No.: 17/632,397

(22) PCT Filed: Jul. 6, 2020

(86) PCT No.: PCT/JP2020/026466
§ 371 (c)(1),
(2) Date: Feb. 2, 2022

(87) PCT Pub. No.: WO2021/024676
PCT Pub. Date: Feb. 11, 2021

(65) Prior Publication Data
US 2022/0290604 A1    Sep. 15, 2022

(30) Foreign Application Priority Data

Aug. 7, 2019 (JP) .................................. 2019-145543

(51) Int. Cl.
*F01N 13/08* (2010.01)
*B60K 11/04* (2006.01)
(Continued)

(52) U.S. Cl.
CPC ............ *F01N 13/082* (2013.01); *B60K 11/04* (2013.01); *B60K 11/06* (2013.01); *B60K 13/04* (2013.01);
(Continued)

(58) Field of Classification Search
CPC .......... F01N 13/082; F01N 3/021; F01N 3/05; F01N 2260/022; F01N 2470/04;
(Continued)

(56) References Cited

U.S. PATENT DOCUMENTS 1,887,781 A * 11/1932 Parr .......................... F01P 11/06
123/41.01
3,415,338 A * 12/1968 McMillan ................. F01N 1/06
181/227

(Continued)

FOREIGN PATENT DOCUMENTS

CN    110801139 A  *  2/2020
JP    S60160229 U  *  10/1985

(Continued)

OTHER PUBLICATIONS

International Preliminary Report on Patentability dated Feb. 8, 2022 with a Translation of the Written Opinion of the International Searching Authority in Application No. PCT/JP2020/026466.

*Primary Examiner* — James A Shriver, II
*Assistant Examiner* — Michael T. Walsh
(74) *Attorney, Agent, or Firm* — Sughrue Mion, PLLC (57) ABSTRACT

A forklift includes a downstream exhaust pipe that releases engine exhaust gas into the atmosphere. The downstream exhaust pipe includes a tail pipe extending in a width direction of a vehicle body. A closure part that closes a tail pipe's opening is provided at the tail pipe's tip end portion. A first exhaust port which discharges the exhaust gas rearward from the vehicle body and a second exhaust port which discharges the exhaust gas rearward from the vehicle body at the tail pipe's tip end side with respect to the first exhaust port are provided in the tail pipe's circumferential surface portion. The first exhaust port and the second exhaust port are disposed in a region where cooling air flows. A throttling (Continued)

part that changes a flow path area for the exhaust gas is disposed between the first exhaust port and the second exhaust port in the tail pipe.

5 Claims, 9 Drawing Sheets

(51) Int. Cl.
    *B60K 11/06*     (2006.01)
    *B60K 13/04*     (2006.01)

(52) U.S. Cl.
    CPC ....... *B60Y 2200/15* (2013.01); *B60Y 2400/89* (2013.01)

(58) Field of Classification Search
    CPC .. F01N 2470/22; F01N 2590/08; F01N 13/08; B60K 11/04; B60K 11/06; B60K 13/04; B60K 11/08; B60K 2007/0069; B60Y 2200/15; B60Y 2400/89; B66F 9/07595; B66F 9/07554
    See application file for complete search history.

(56) References Cited

U.S. PATENT DOCUMENTS

| | | | |
|---|---|---|---|
| 6,283,162 B1 * | 9/2001 | Butler | F01N 13/08 |
| | | | 138/109 |
| 2007/0029132 A1 * | 2/2007 | Feight | F01N 13/082 |
| | | | 181/227 |
| 2013/0186077 A1 | 7/2013 | Morimoto et al. | |
| 2014/0110935 A1 * | 4/2014 | Shiizaki | F01N 13/082 |
| | | | 285/332 |

FOREIGN PATENT DOCUMENTS

| | | | |
|---|---|---|---|
| JP | 62-145836 U | | 9/1987 |
| JP | S62145836 U | * | 9/1987 |
| JP | 6-043218 U | | 6/1994 |
| JP | H0643218 U | * | 6/1994 |
| JP | 2001033157 A | * | 2/2001 |
| JP | 2013-19291 A | | 1/2013 |
| JP | 2013029234 A | * | 2/2013 |
| JP | 2013-49405 A | | 3/2013 |
| JP | 2014031755 A | * | 2/2014 |
| JP | 2014504692 A | * | 2/2014 |
| JP | 2015-165097 A | | 9/2015 |

* cited by examiner

INDUSTRIAL VEHICLE

CROSS REFERENCE TO RELATED APPLICATION

This application is a National Stage of International Application No. PCT/JP2020/026466 filed Jul. 6, 2020, claiming priority based on Japanese Patent Application No. 2019-145543 filed Aug. 7, 2019.

TECHNICAL FIELD

The present disclosure relates to an industrial vehicle.

BACKGROUND ART

As an industrial vehicle, for example, a forklift like that described in Patent Literature 1 is known. The forklift described in Patent Literature 1 includes a DPF that collects particulate matter contained in exhaust gas discharged from a diesel engine and removes it, an exhaust pipe connected to an exhaust gas releasing side of the DPF, and a tail pipe connected to the exhaust pipe via a pipe joint structure. Since a tip end portion of the exhaust pipe is inserted into an opening of the tail pipe, a gap is formed between a tip end portion of the exhaust pipe and the opening of the tail pipe. When the exhaust gas is exhausted from the exhaust pipe to the tail pipe, outside air is introduced into the tail pipe due to a Venturi effect.

CITATION LIST

Patent Literature

[Patent Literature 1] Japanese Unexamined Patent Publication No. 2013-19291

SUMMARY OF INVENTION

Technical Problem

In the above-mentioned related art, when the outside air is introduced into the tail pipe, an exhaust temperature of the exhaust gas is reduced. However, the industrial vehicle such as the forklift is used not only outdoors but also indoors such as in a factory or a warehouse. Therefore, in the industrial vehicle, it is desired to reduce the exhaust temperature of the exhaust gas reliably and evenly.

An object of the present disclosure is to provide an industrial vehicle capable of reliably and evenly reducing the exhaust temperature of exhaust gas.

Solution to Problem

According to an aspect of the present disclosure, there is provided an industrial vehicle including: a counterweight located at a rear portion of a vehicle body; a radiator disposed in front of the counterweight; a radiator fan configured to generate cooling air flowing behind the vehicle body; and an exhaust pipe disposed inside the counterweight to release exhaust gas from an engine into the atmosphere, wherein the exhaust pipe has a tail pipe extending in a vehicle width direction of the vehicle body, wherein a closure part configured to close an opening of the tail pipe is provided at a tip end portion of the tail pipe, wherein a first exhaust port configured to discharge the exhaust gas rearward from the vehicle body and a second exhaust port configured to discharge the exhaust gas rearward from the vehicle body at a tip end side of the tail pipe with respect to the first exhaust port are provided in a circumferential surface portion of the tail pipe, wherein the first exhaust port and the second exhaust port are disposed in a region where the cooling air flows, and wherein a throttling part configured to change a flow path area for the exhaust gas is disposed between the first exhaust port and the second exhaust port in the tail pipe.

In such an industrial vehicle, the first exhaust port and the second exhaust port provided on the circumferential surface portion of the tail pipe are disposed in the region where the cooling air flows in the counterweight. Therefore, the exhaust gas discharged from the first exhaust port and the second exhaust port is discharged rearward from the vehicle body in a state in which it is agitated with the cooling air in the counterweight. Accordingly, it is possible to reliably reduce the exhaust temperature of the exhaust gas. Further, the throttling part that changes a flow path area for the exhaust gas is disposed between the first exhaust port and the second exhaust port in the tail pipe. Therefore, since the pressure in the tail pipe is made even, the exhaust gas is easily discharged evenly from the first exhaust port and the second exhaust port. Accordingly, it is possible to evenly reduce the exhaust temperature of the exhaust gas. Further, because the discharge flow velocity of the exhaust gas is reduced in this industrial vehicle as compared with, for example, the case where the exhaust gas is discharged only from the second exhaust port, it is possible to suppress the exhaust noise.

The throttling part may be disposed on a side of the first exhaust port and the second exhaust port in the tail pipe. In such a configuration, since the pressure in the tail pipe is made more even, the exhaust gas is easily discharged from the first exhaust port and the second exhaust port more evenly. Therefore, it is possible to reduce the exhaust temperature of the exhaust gas more evenly.

The throttling part may be formed of a plate-shaped member having substantially a U shape which is fixed to the tail pipe, and an inclination part inclined with respect to a front-rear direction and a vehicle width direction of the vehicle body may be provided on a side of the second exhaust port in the plate-shaped member. In such a configuration, it is possible to easily and inexpensively manufacture the throttling part due to the plate-shaped member having substantially a U shape. Further, since the inclination part is provided on a side of the second exhaust port in the plate-shaped member, a swirl flow (a turbulent flow) is less likely to occur in the vicinity of the throttling part in the tail pipe. Therefore, it is possible to efficiently discharge the exhaust gas from the first exhaust port and the second exhaust port.

The closure part may have an inclination portion inclined with respect to a front-rear direction and a vehicle width direction of the vehicle body to taper from a side opposite to the first exhaust port and the second exhaust port toward a side of the first exhaust port and the second exhaust port. In such a configuration, a swirl flow (a turbulent flow) is less likely to occur in the vicinity of the closure part in the tail pipe. Therefore, it is possible to efficiently discharge the exhaust gas from the first exhaust port and the second exhaust port.

The tail pipe may have a first pipe having the first exhaust port and a second pipe having the second exhaust port, one end portion of one of the first pipe and the second pipe may be provided with a fitting part configured to fit the other of the first pipe and the second pipe, and the throttling part may be integrated with the fitting part. In such a configuration, because the first pipe having the first exhaust port and the second pipe having the second exhaust port are fitted by the fitting part, the tail pipe having the throttling part disposed between the first exhaust port and the second exhaust port is obtained. Therefore, for example, even if the tail pipe becomes long, it is possible to easily make the tail pipe having the throttling part.

The first exhaust port and the second exhaust port may be disposed to avoid a position corresponding to a central portion of the radiator fan in the region where the cooling air flows. In such a configuration, the exhaust gas discharged from the first exhaust port and the second exhaust port is discharged rearward from the vehicle body in a state in which it is sufficiently agitated with the cooling air in the counterweight. Accordingly, it is possible to reduce the exhaust temperature of the exhaust gas more reliably.

Advantageous Effects of Invention

According to the present disclosure, it is possible to reliably and evenly reduce the exhaust temperature of the exhaust gas.

DESCRIPTION OF EMBODIMENTS

Hereinafter, embodiments of the present disclosure will be described in detail with reference to the drawings. In the drawings, the same or equivalent elements will be denoted by the same reference signs, and redundant description will be omitted.

Figure 1:
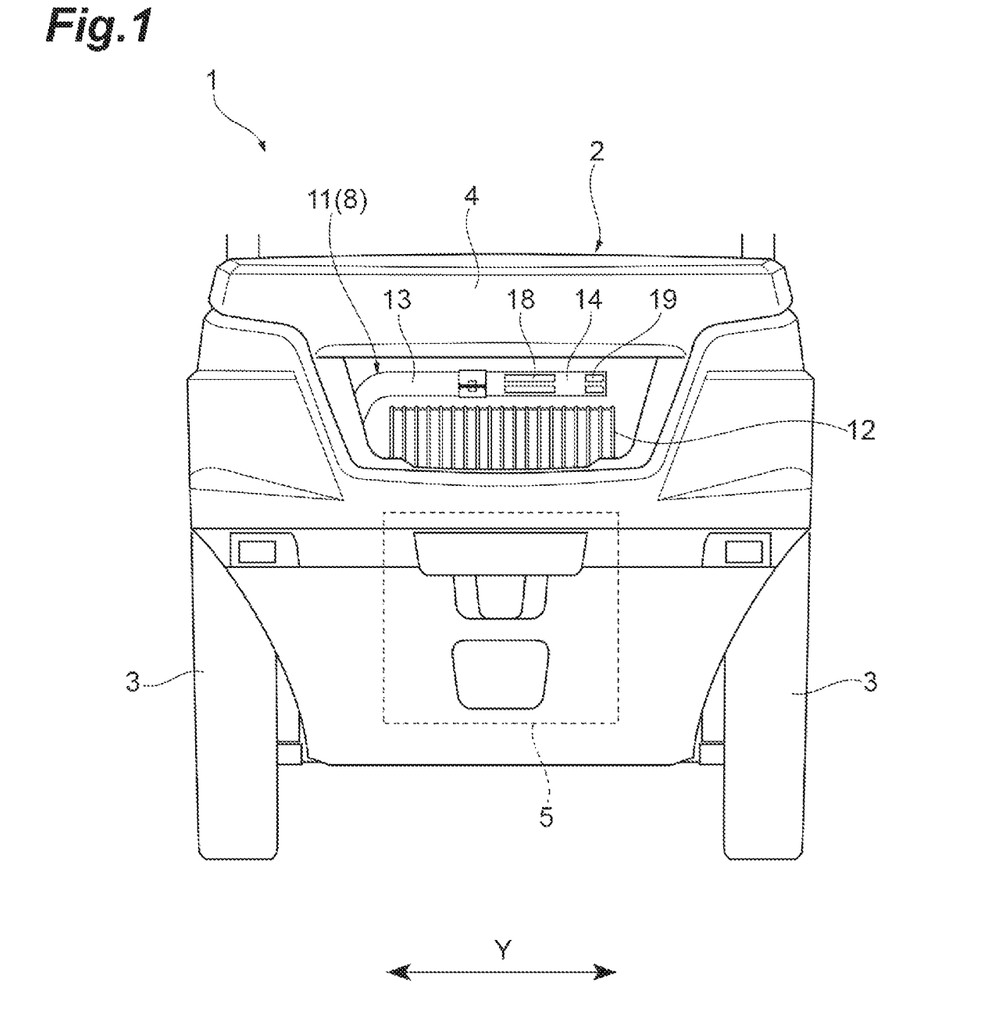
FIG. 1 is a rear view showing a forklift which is an industrial vehicle according to an embodiment of the present disclosure.
Figure 2:
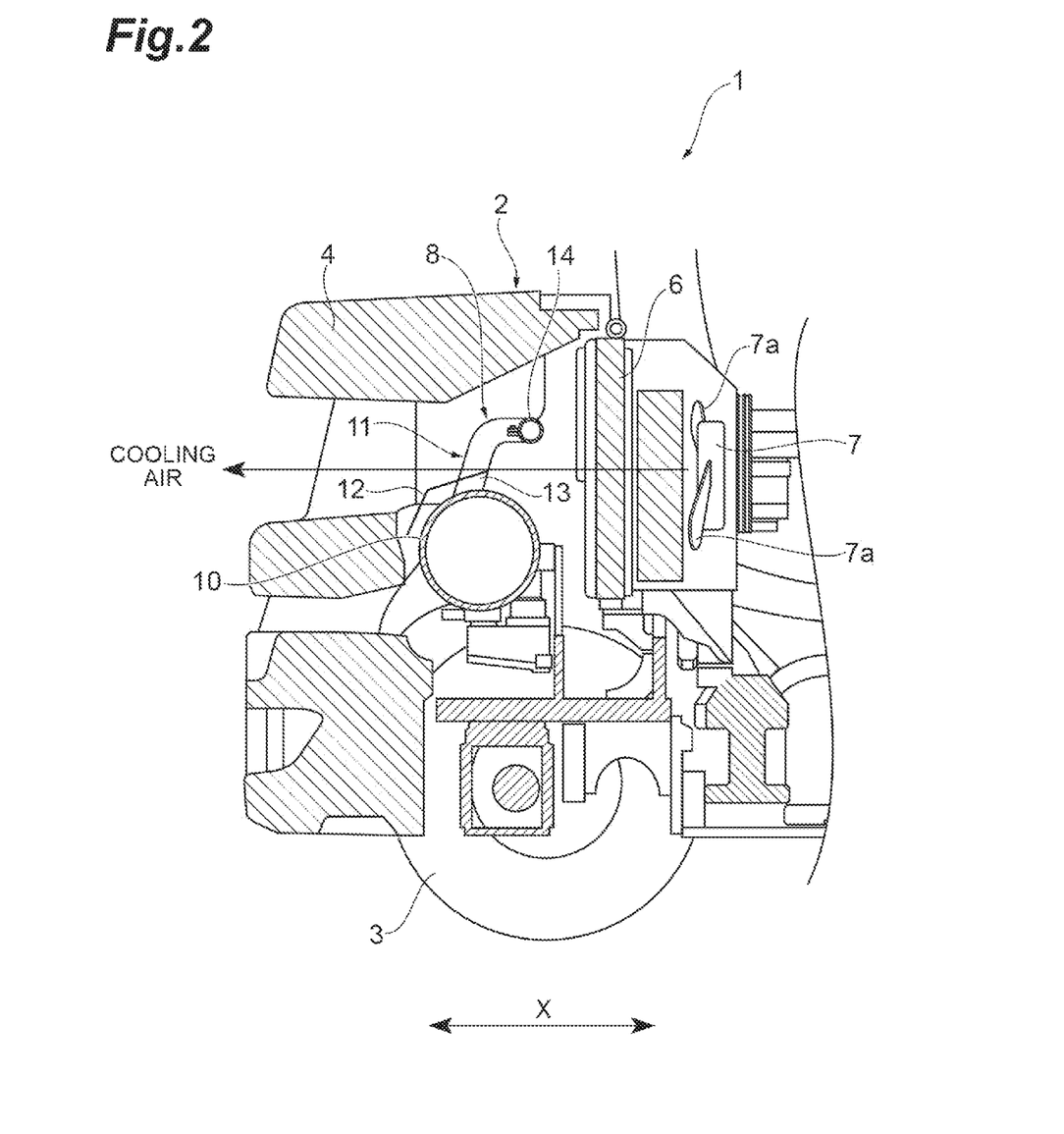
FIG. 2 is a side sectional view showing an internal structure of a rear portion of the forklift shown in FIG. 1.

FIG. 1 is a rear view showing a forklift which is an industrial vehicle according to an embodiment of the present disclosure. FIG. 2 is a side sectional view showing an internal structure of a rear portion of the forklift shown in FIG. 1. In FIGS. 1 and 2, a forklift 1 of the present embodiment includes a vehicle body 2, four wheels 3 rotatably attached to a lower portion of the vehicle body 2, and a cargo handling device (not shown) attached to a front end portion of the vehicle body 2.

A counterweight 4 for balancing the weight of the forklift 1 is disposed at a rear portion of the vehicle body 2. An engine 5 is disposed in front of the counterweight 4. The engine 5 here is a diesel engine.

A radiator 6 for cooling engine cooling water is disposed between the counterweight 4 and the engine 5. A radiator fan 7 that generates cooling air flowing behind the vehicle body 2 is disposed in front of the radiator 6. The radiator fan 7 has a plurality of blades 7a. When each blade 7a of the radiator fan 7 rotates, cooling air flowing behind the vehicle body 2 is generated, and the cooling air passes through the radiator 6 to cool the high-temperature engine cooling water flowing in the radiator 6.

Figure 3:
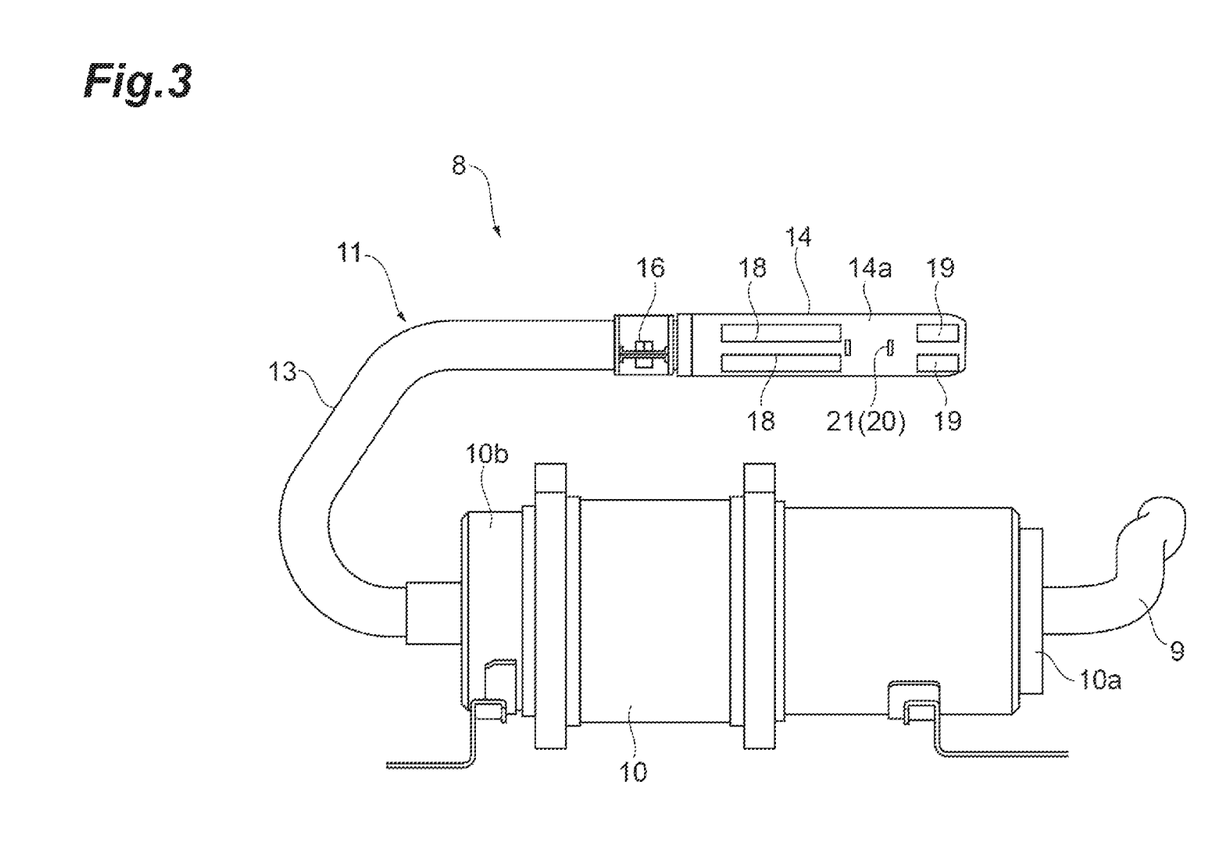
FIG. 3 is a front view of an exhaust gas purification device shown in FIGS. 1 and 2.

Further, the forklift 1 includes an exhaust gas purification device 8 that purifies the exhaust gas discharged from the engine 5. As shown in FIG. 3, the exhaust gas purification device 8 has an upstream exhaust pipe 9, a diesel particulate filter (DPF) 10, and a downstream exhaust pipe 11. The upstream exhaust pipe 9 connects the engine 5 and an inlet portion 10a of the DPF 10.

The DPF 10 collects particulate matter (PM) contained in the exhaust gas discharged from the engine 5 and removes it. The DPF 10 is disposed to be covered with the counterweight 4. A DPF guard 12 is disposed in the counterweight 4 to prevent the DPF 10 from being touched.

The downstream exhaust pipe 11 has a connecting pipe 13 connected to an outlet portion 10b of the DPF 10 and a tail pipe 14 connected to a tip end portion of the connecting pipe 13. That is, the tail pipe 14 is disposed on a downstream side of the connecting pipe 13. The DPF 10 and the connecting pipe 13 are connected to each other by a bolt 15 (see FIG. 4). The connecting pipe 13 and the tail pipe 14 are connected to each other by a bolt 16.

The connecting pipe 13 is bent in substantially a U shape. The tail pipe 14 is disposed above the DPF 10. The tail pipe 14 is disposed above a position corresponding to a central portion of the radiator fan 7. The tail pipe 14 extends linearly in a vehicle width direction (a Y direction) of the vehicle body 2.

Figure 4:
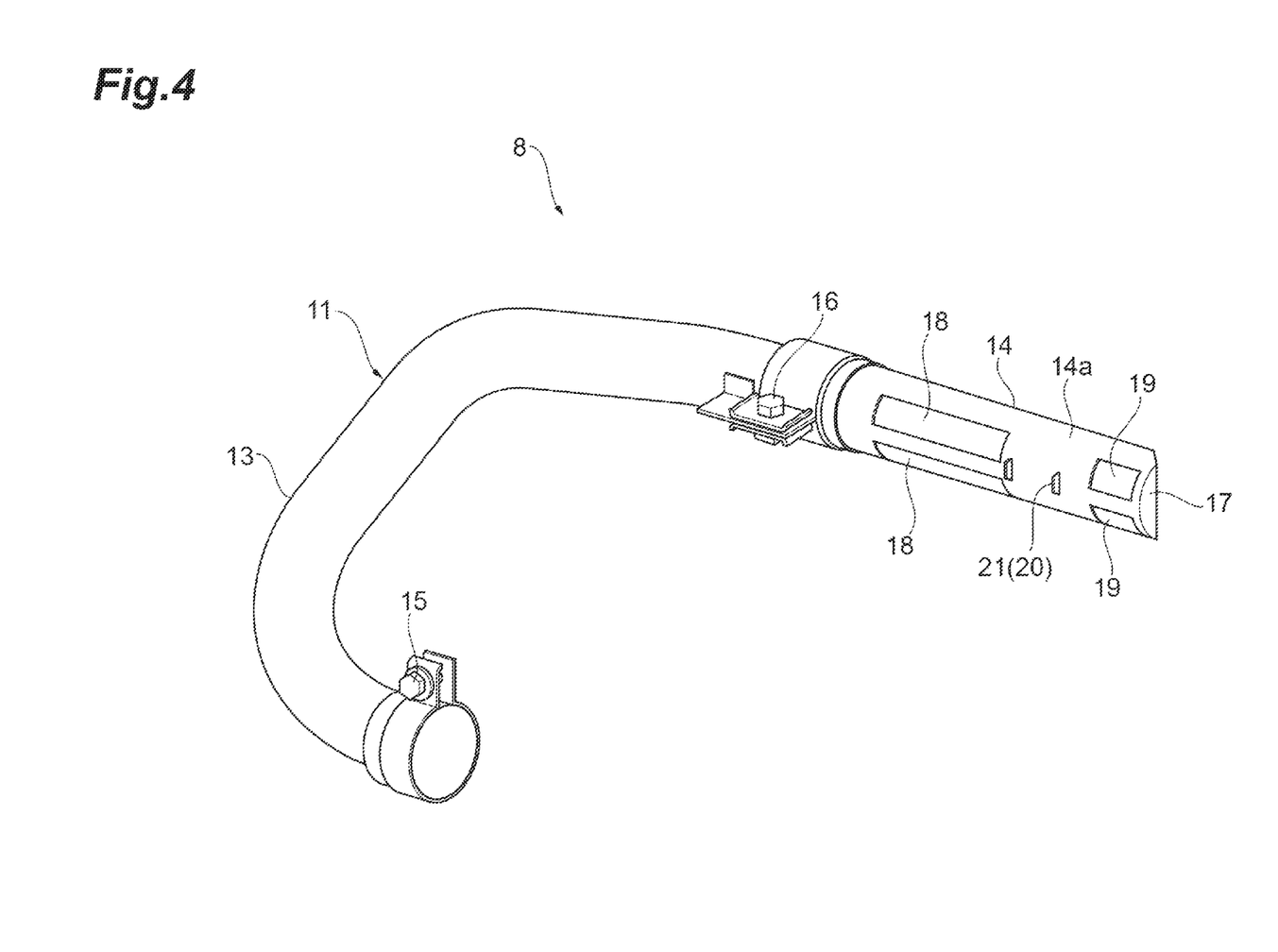
FIG. 4 is a perspective view of a downstream exhaust pipe shown in FIG. 3.
Figure 5:
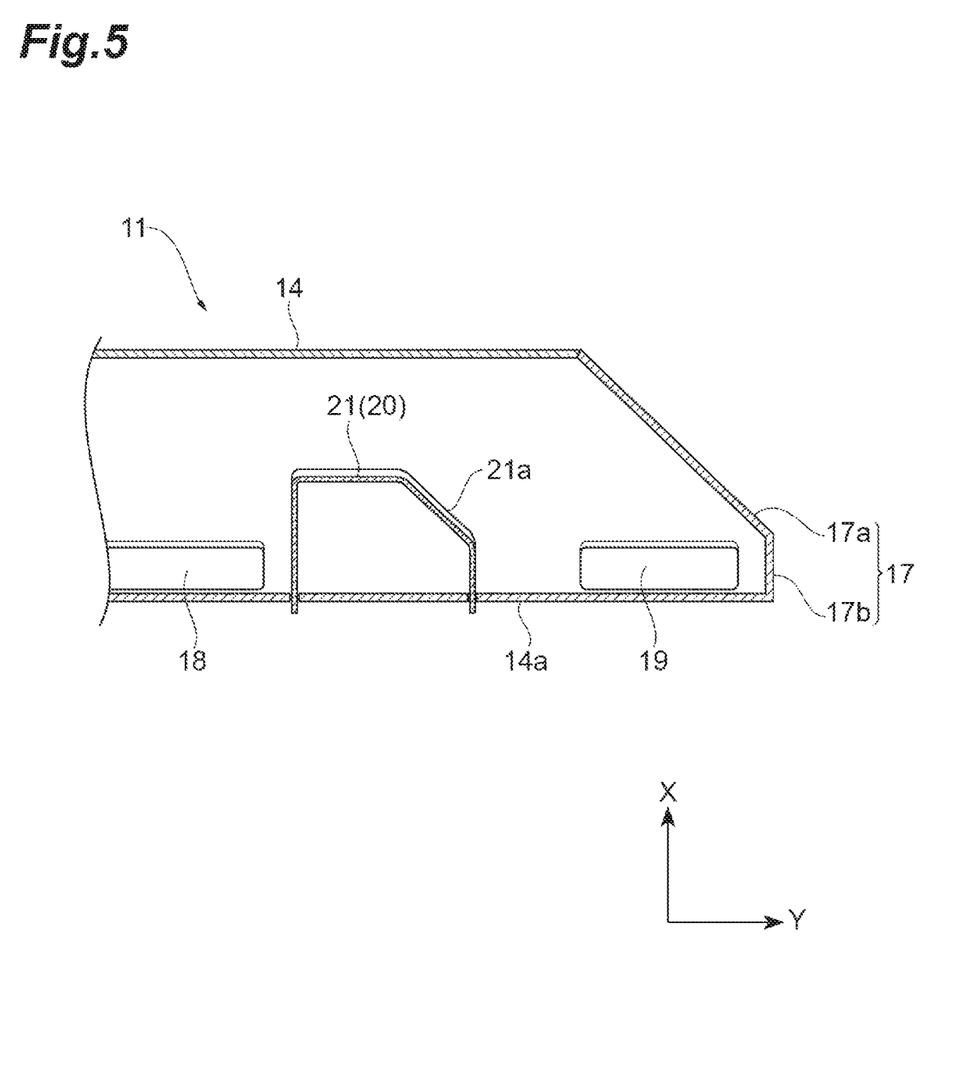
FIG. 5 is a sectional view of a tail pipe shown in FIG. 4.

As shown in FIGS. 4 and 5, a closure part 17 that closes an opening of the tail pipe 14 is provided at a tip end portion of the tail pipe 14. Two upper and lower first exhaust ports 18 and two upper and lower second exhaust ports 19 are provided on a rear side portion of a circumferential surface portion 14a of the tail pipe 14. The first exhaust port 18 discharges the exhaust gas flowing in the tail pipe 14 rearward from the vehicle body 2. The second exhaust port 19 discharges the exhaust gas flowing in the tail pipe 14 rearward from the vehicle body 2 at a tip end side (a downstream side) of the tail pipe 14 with respect to the first exhaust port 18. The first exhaust port 18 and the second exhaust port 19 have rectangular shapes, for example.

The first exhaust port 18 and the second exhaust port 19 are disposed side by side in the vehicle width direction of the vehicle body 2. The second exhaust port 19 is disposed outside the first exhaust port 18 in the vehicle width direction. The first exhaust port 18 and the second exhaust port 19 are disposed in a region where the cooling air generated by the rotation of the radiator fan 7 flows. Specifically, the first exhaust port 18 and the second exhaust port 19 are disposed in a region corresponding to a position at which the blade 7a of the radiator fan 7 is disposed. Accordingly, the first exhaust port 18 and the second exhaust port 19 are disposed to avoid a position corresponding to a central portion of the radiator fan 7 in the region where the cooling air flows.

The first exhaust port 18 and the second exhaust port 19 located on an upper side of the circumferential surface portion 14a of the tail pipe 14 are formed to be slightly inclined upward. The first exhaust port 18 and the second exhaust port 19 located on a lower side of the circumferential surface portion 14a of the tail pipe 14 are formed to be slightly inclined downward. As a result, the exhaust gas discharged from the first exhaust port 18 and the second exhaust port 19 is likely to be diffused and dispersed in the counterweight 4.

At this time, directions of the first exhaust port 18 and the second exhaust port 19 are set, for example, to form an angle such that the exhaust gas discharged from the first exhaust port 18 and the second exhaust port 19 does not hit an inner wall surface of the counterweight 4. This prevents the paint on the counterweight 4 from peeling off due to the exhaust gas.

The closure part 17 of the tail pipe 14 has an inclination portion 17a inclined with respect to a front-rear direction (an X direction) and a vehicle width direction (a Y direction) of the vehicle body 2 to taper from a side opposite to the first exhaust port 18 and the second exhaust port 19 toward a side of the first exhaust port 18 and the second exhaust port 19, and a bow-shaped portion 17b disposed on a side of the first exhaust port 18 and the second exhaust port 19 with respect to the inclination portion 17a. A tip end of a portion on a side of the first exhaust port 18 and the second exhaust port 19 is located outside a tip end of a portion on the side opposite to the first exhaust port 18 and the second exhaust port 19 in the vehicle width direction.

A throttling part 20 that changes a flow path area for the exhaust gas is disposed between the first exhaust port 18 and the second exhaust port 19 in the tail pipe 14. The throttling part 20 is formed of a plate-shaped member 21 having substantially a U shape which is fixed to the tail pipe 14. The plate-shaped member 21 is disposed on a side (a rear side) of the first exhaust port 18 and the second exhaust port 19 in the tail pipe 14. Both end portions of the plate-shaped member 21 are welded to the circumferential surface portion 14a in a state in which they penetrate the circumferential surface portion 14a of the tail pipe 14 from the inside of the tail pipe 14. Both end portions of the plate-shaped member 21 project from the circumferential surface portion 14a of the tail pipe 14 to the outside of the tail pipe 14.

An inclination part 21a inclined with respect to the front-rear direction and the vehicle width direction of the vehicle body 2 is provided on a side of the second exhaust port 19 in the plate-shaped member 21. The inclination part 21a is substantially parallel to the inclination portion 17a of the closure part 17. Because the inclination portion 17a and the inclination part 21a are provided, the exhaust gas that has passed through the throttling part 20 can easily flow toward the second exhaust port 19.

Because the throttling part 20 is disposed in the tail pipe 14 in this way, a flow path for the exhaust gas is blocked between the first exhaust port 18 and the second exhaust port 19 in the tail pipe 14, and a pressure in the tail pipe 14 is made even. At this time, opening areas of the first exhaust port 18 and the second exhaust port 19 and a disposition position of the throttling part 20 are set such that the exhaust gas flowing in the tail pipe 14 is discharged from the first exhaust port 18 and the second exhaust port 19 at substantially the same flow rate. For example, the opening area of the first exhaust port 18 is larger than the opening area of the second exhaust port 19. Further, the throttling part 20 is disposed closer to the first exhaust port 18 than to the second exhaust port 19.

As long as the exhaust gas is discharged from the first exhaust port 18 and the second exhaust port 19 at substantially the same flow rate, the opening areas of the first exhaust port 18 and the second exhaust port 19 and the disposition position of the throttling part 20 are not particularly limited to the above configuration.

In the forklift 1 described above, the exhaust gas discharged from the engine 5 flows in the upstream exhaust pipe 9 and is supplied to the DPF 10. The exhaust gas flows in the downstream exhaust pipe 11 in a state in which the PM is removed in the DPF 10. Then, the exhaust gas flowing in the downstream exhaust pipe 11 is discharged rearward from the vehicle body 2 from the first exhaust port 18 and the second exhaust port 19 provided on the circumferential surface portion 14a of the tail pipe 14.

Incidentally, as the regeneration of the DPF 10, there are automatic regeneration in which an exhaust temperature is raised to burn the PM while the forklift 1 is running and manual regeneration in which an exhaust temperature is raised to burn the PM while the forklift 1 is stopped. The forklift 1 is used not only outdoors but also indoors such as in a factory or a warehouse. Therefore, in the forklift 1, it is necessary to reduce the exhaust temperature of the exhaust gas before the exhaust gas is released into the atmosphere.

In response to such a request, in the present embodiment, the first exhaust port 18 and the second exhaust port 19 provided on the circumferential surface portion 14a of the tail pipe 14 are disposed in the region where the cooling air flows in the counterweight 4. Therefore, the exhaust gas discharged from the first exhaust port 18 and the second exhaust port 19 is discharged rearward from the vehicle body 2 in a state in which it is agitated with the cooling air in the counterweight 4. Accordingly, it is possible to reliably reduce the exhaust temperature of the exhaust gas.

Further, in a case in which the throttling part 20 is not disposed in the tail pipe 14, the pressure on a downstream side (a side of the second exhaust port 19) in the tail pipe 14 increases due to the inertia of the exhaust gas, and thus the exhaust gas may be discharged only from the second exhaust port 19. In this case, since a discharge flow velocity of the exhaust gas increases, loud noise and abnormal noise are generated.

However, in the present embodiment, the throttling part 20 that changes a flow path area for the exhaust gas is disposed between the first exhaust port 18 and the second exhaust port 19 in the tail pipe 14. Therefore, since the pressure in the tail pipe 14 is made even, the exhaust gas is easily discharged evenly from the first exhaust port 18 and the second exhaust port 19. Therefore, it is possible to evenly reduce the exhaust temperature of the exhaust gas. Further, because the discharge flow velocity of the exhaust gas is reduced as compared with, for example, the case where the exhaust gas is discharged only from the second exhaust port 19, it is possible to suppress the exhaust noise.

Further, in the present embodiment, the throttling part 20 is disposed on a side of the first exhaust port 18 and the second exhaust port 19 in the tail pipe 14. Therefore, since the pressure in the tail pipe 14 is made more even, the exhaust gas is easily discharged from the first exhaust port 18 and the second exhaust port 19 more evenly. Therefore, it is possible to reduce the exhaust temperature of the exhaust gas more evenly.

Further, in the present embodiment, it is possible to easily and inexpensively manufacture the throttling part 20 due to the plate-shaped member 21 having substantially a U shape. Further, since the inclination part 21a is provided on a side of the second exhaust port 19 in the plate-shaped member 21, a swirl flow (a turbulent flow) is less likely to occur in the vicinity of the throttling part 20 in the tail pipe 14. Therefore, it is possible to efficiently discharge the exhaust gas from the first exhaust port 18 and the second exhaust port 19.

Further, in the present embodiment, the closure part 17 of the tail pipe 14 has an inclination portion 17a inclined to taper from a side opposite to the first exhaust port 18 and the second exhaust port 19 toward a side of the first exhaust port 18 and the second exhaust port 19. Accordingly, a swirl flow (a turbulent flow) is less likely to occur in the vicinity of the closure part 17 in the tail pipe 14. Therefore, it is possible to discharge the exhaust gas from the first exhaust port 18 and the second exhaust port 19 more efficiently.

Further, in the present embodiment, the first exhaust port 18 and the second exhaust port 19 are disposed to avoid a position corresponding to a central portion of the radiator fan 7 in the region where the cooling air generated by the rotation of the radiator fan 7 flows. Therefore, the exhaust gas discharged from the first exhaust port 18 and the second exhaust port 19 is discharged rearward from the vehicle body 2 in a state in which it is sufficiently agitated with the cooling air in the counterweight 4. Accordingly, it is possible to reduce the exhaust temperature of the exhaust gas more reliably.

Figure 6:
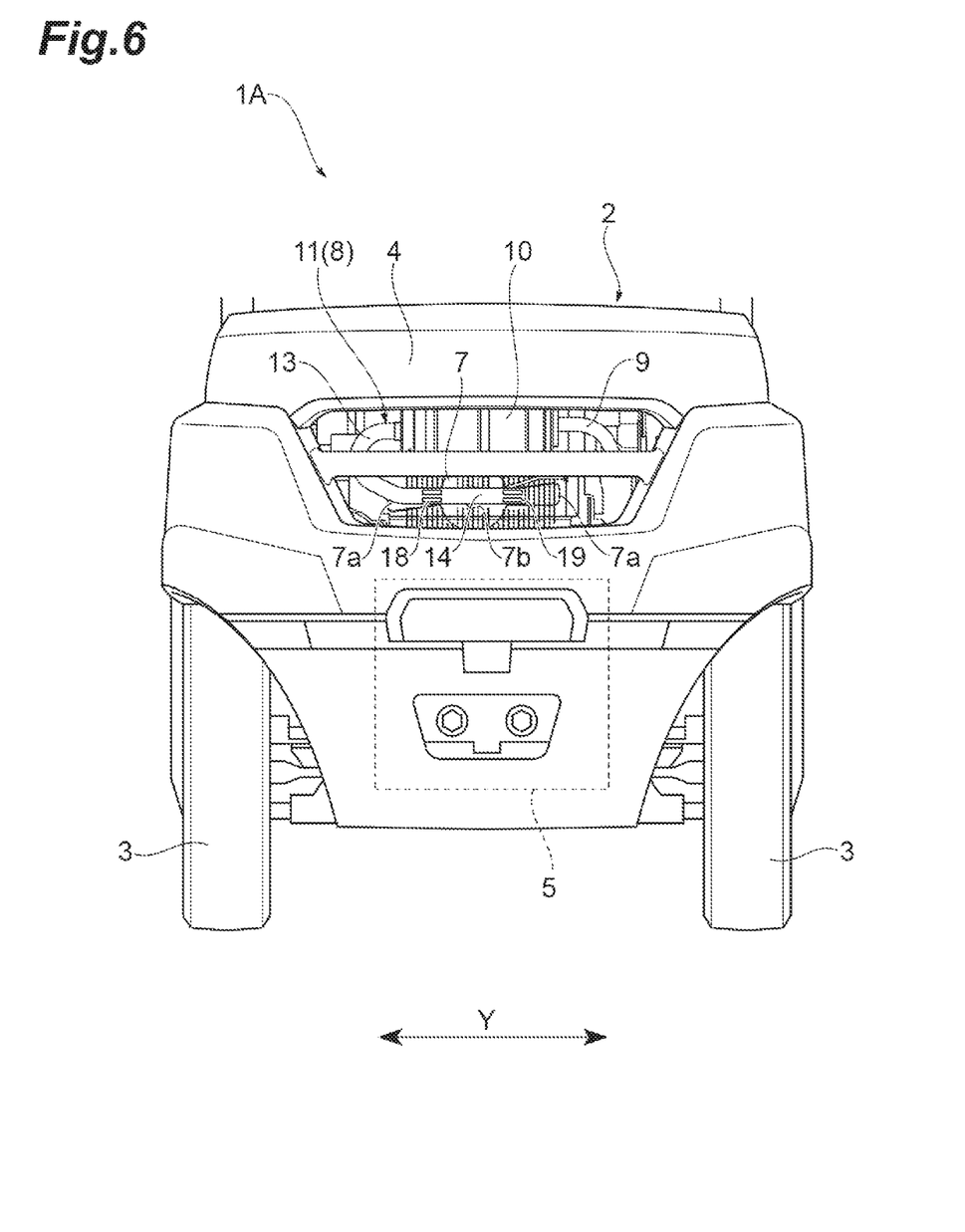
FIG. 6 is a rear view showing a forklift which is an industrial vehicle according to another embodiment of the present disclosure.
Figure 7:
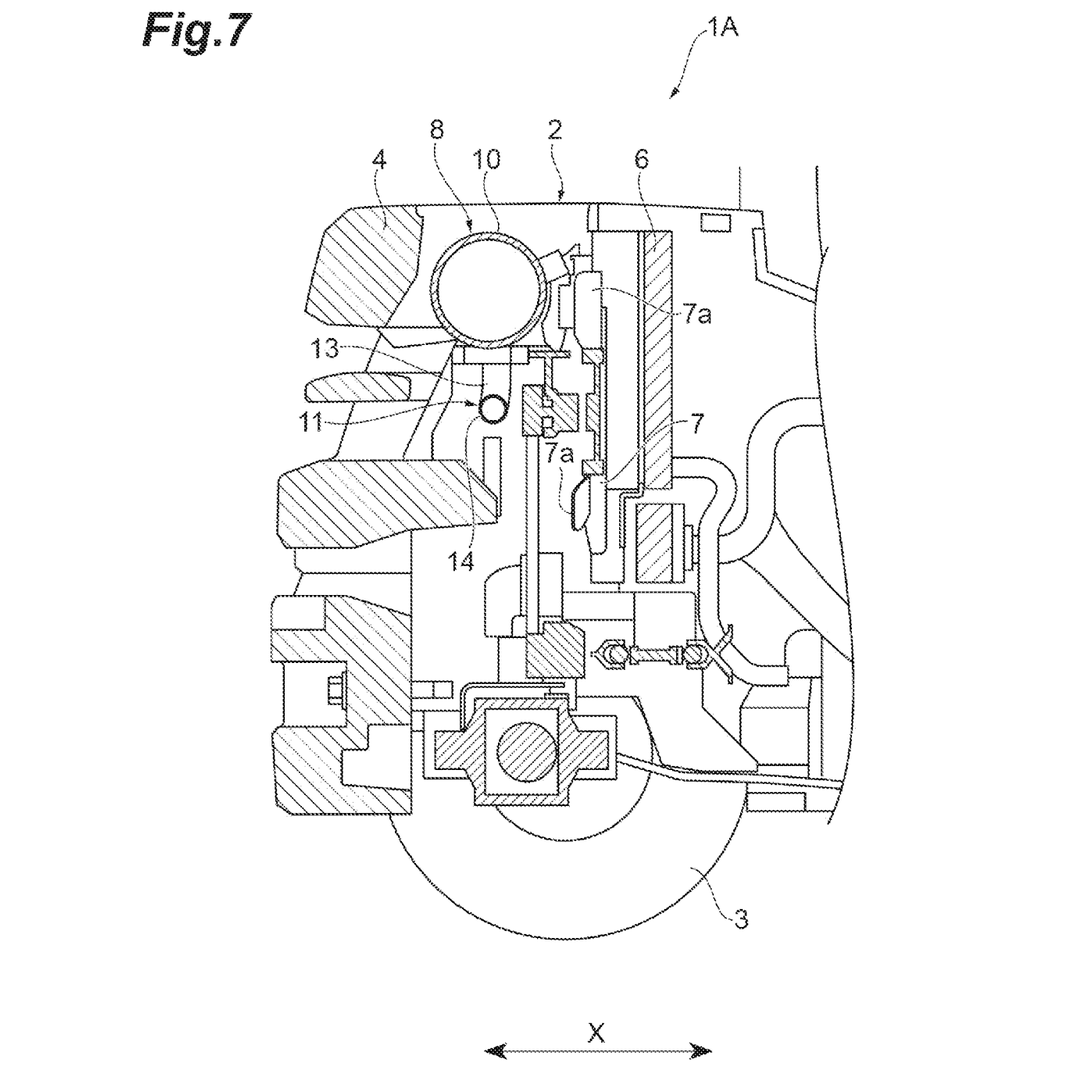
FIG. 7 is a side sectional view showing an internal structure of a rear portion of the forklift shown in FIG. 6.

FIG. 6 is a rear view showing a forklift which is an industrial vehicle according to another embodiment of the present disclosure. FIG. 7 is a side sectional view showing an internal structure of a rear portion of the forklift shown in FIG. 6. In FIGS. 6 and 7, the type of a forklift 1A of the present embodiment is different from that of the forklift 1 of the above embodiment.

Like the forklift 1 of the above embodiment, the forklift 1A includes the counterweight 4, the engine 5, the radiator 6, the radiator fan 7, and the exhaust gas purification device 8. The radiator fan 7 is disposed behind the radiator 6.

Figure 8:
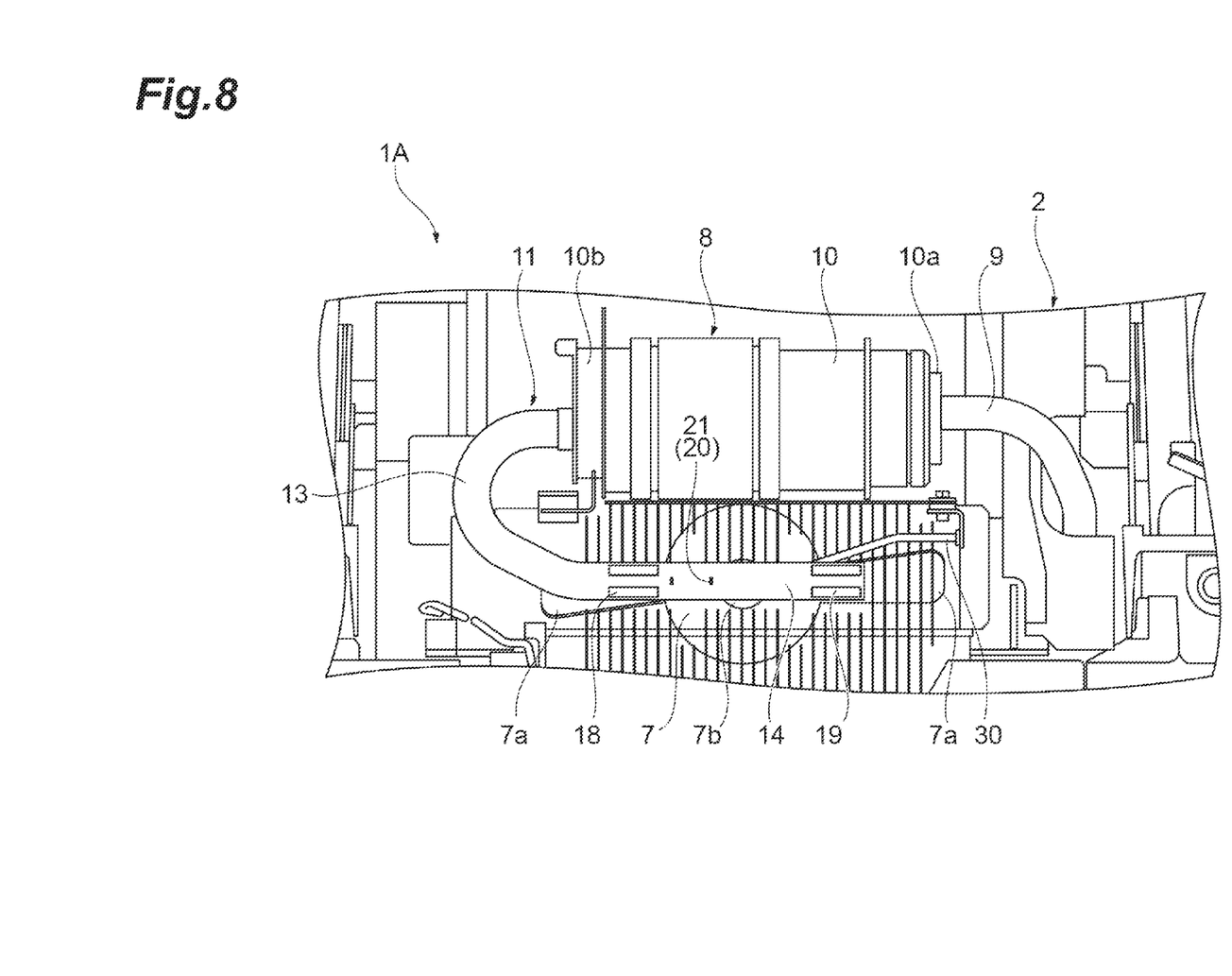
FIG. 8 is an enlarged rear view of the forklift including an exhaust gas purification device shown in FIG. 6.

As shown in FIG. 8, the exhaust gas purification device 8 has the upstream exhaust pipe 9, the DPF 10, and the downstream exhaust pipe 11 as in the above embodiment. The downstream exhaust pipe 11 has the connecting pipe 13 connected to the outlet portion 10b of the DPF 10 and the tail pipe 14 connected to the tip end portion of the connecting pipe 13. The tail pipe 14 is disposed below the DPF 10. The tail pipe 14 is disposed directly behind a central portion 7b of the radiator fan 7. The tail pipe 14 extends linearly in the vehicle width direction (the Y direction) of the vehicle body 2. The tail pipe 14 is fixed to the vehicle body 2 via an attachment rod 30.

Two upper and lower first exhaust ports 18 and two upper and lower second exhaust ports 19 are provided in a circumferential surface portion 14a of the tail pipe 14 as in the above embodiment. The first exhaust port 18 and the second exhaust port 19 are disposed in a region corresponding to a position at which the blade 7a of the radiator fan 7 is disposed. Therefore, the first exhaust port 18 and the second exhaust port 19 are disposed to avoid a position corresponding to the central portion 7b of the radiator fan 7 in the region where the cooling air generated by the rotation of the radiator fan 7 flows.

The throttling part 20 that changes a flow path area for the exhaust gas is provided between the first exhaust port 18 and the second exhaust port 19 in the tail pipe 14 as in the above embodiment. Here, the opening areas of the first exhaust port 18 and the second exhaust port 19 are substantially equal. Further, the throttling part 20 is disposed closer to the first exhaust port 18 than to the second exhaust port 19.

Also in the present embodiment described above, the first exhaust port 18 and the second exhaust port 19 provided on the circumferential surface portion 14a of the tail pipe 14 are disposed in the region where the cooling air flows in the counterweight 4. Therefore, the exhaust gas discharged from the first exhaust port 18 and the second exhaust port 19 is discharged rearward from the vehicle body 2 in a state in which it is agitated with the cooling air in the counterweight 4. Accordingly, it is possible to reliably reduce the exhaust temperature of the exhaust gas. Further, the throttling part 20 that changes a flow path area for the exhaust gas is disposed between the first exhaust port 18 and the second exhaust port 19 in the tail pipe 14. Therefore, since the pressure in the tail pipe 14 is made even, the exhaust gas is easily discharged evenly from the first exhaust port 18 and the second exhaust port 19. Accordingly, it is possible to evenly reduce the exhaust temperature of the exhaust gas. Further, the discharge flow velocity of the exhaust gas is reduced, and thus it is possible to suppress the exhaust noise.

Further, in the present embodiment, the tail pipe 14 is disposed directly behind the central portion 7b of the radiator fan 7. However, the first exhaust port 18 and the second exhaust port 19 are disposed to avoid a position corresponding to the central portion 7b of the radiator fan 7 in the region where the cooling air generated by the rotation of the radiator fan 7 flows. Therefore, the exhaust gas discharged from the first exhaust port 18 and the second exhaust port 19 is discharged rearward from the vehicle body 2 in a state in which it is sufficiently agitated with the cooling air in the counterweight 4. Accordingly, it is possible to reduce the exhaust temperature of the exhaust gas more reliably.

Figure 9:
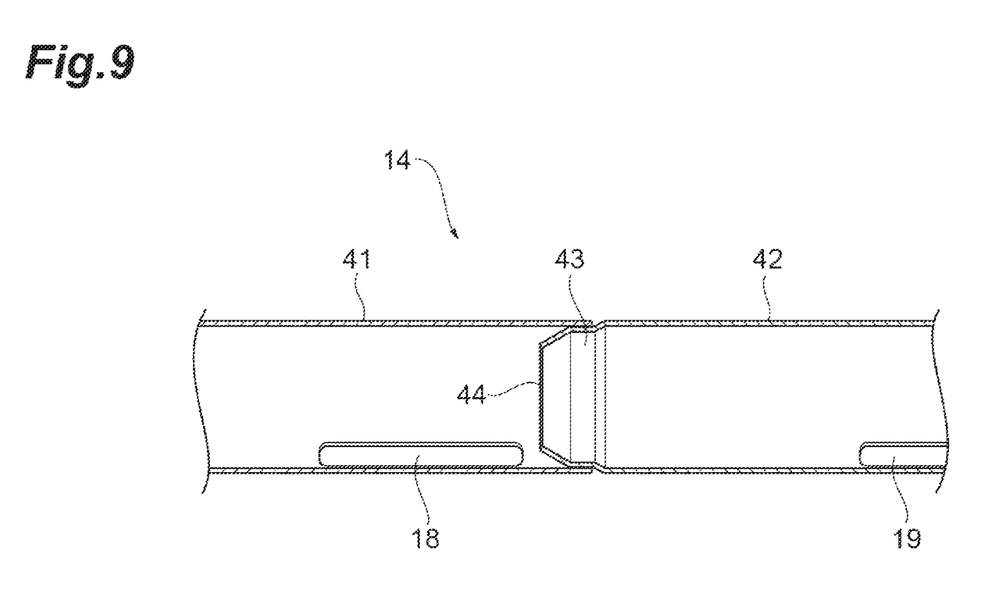
FIG. 9 is a sectional view showing a modification example of the tail pipe shown in FIG. 5.

FIG. 9 is a sectional view showing a modification example of the tail pipe 14. In FIG. 9, the tail pipe 14 of the present modification example has a first pipe 41 connected to the connecting pipe 13 and a second pipe 42 connected to the first pipe 41. The second pipe 42 is disposed on a downstream side of the first pipe 41. Outer diameters of the first pipe 41 and the second pipe 42 are equal. The first pipe 41 has the above first exhaust port 18. The second pipe 42 has the above second exhaust port 19.

A stepped fitting part 43 that fits with the first pipe 41 is provided in an upstream side end portion (one end portion) of the second pipe 42. An outer diameter of a tip end portion of the fitting part 43 is equivalent to an inner diameter of the first pipe 41. A truncated cone-shaped throttling part 44 is integrated with the tip end portion of the fitting part 43. The throttling part 44 is disposed between the first exhaust port 18 and the second exhaust port 19 in the tail pipe 14 to change a flow path area for the exhaust gas. An outer circumferential surface of the tip end portion of the fitting part 43 is welded to an inner circumferential surface of the first pipe 41.

In a modification example such as the present one, because the first pipe 41 having the first exhaust port 18 and the second pipe 42 having the second exhaust port 19 are fitted by the fitting part 43, the tail pipe 14 having the throttling part 44 disposed between the first exhaust port 18 and the second exhaust port 19 is obtained. Therefore, for example, even if the tail pipe 14 becomes long, it is possible to easily make the tail pipe 14 having the throttling part 44.

Although the fitting part 43 is provided in the second pipe 42 on the downstream side, and the fitting part 43 of the second pipe 42 is fitted with the first pipe 41 on the upstream side in the present modification example, the present disclosure is not particularly limited to this form. A fitting part 43 may be provided in the first pipe 41 on the upstream side, and the fitting part 43 of the first pipe 41 may be fitted with the second pipe 42 on the downstream side.

Although some embodiments of the present disclosure have been described above, the present disclosure is not limited to the above embodiments. For example, although the plate-shaped member 21 having substantially a U shape which constitutes the throttling part 20 has the inclination part 21a inclined with respect to the front-rear direction and the vehicle width direction of the vehicle body 2 in the above embodiments, there is no particular need to provide such an inclination part 21a. Further, the throttling part disposed between the first exhaust port 18 and the second exhaust port 19 in the tail pipe 14 is not particularly limited to the structures of the above embodiments and the above modification example, and it is possible to variously modify the throttling part as long as the throttling part has a structure that changes the flow path area of the exhaust gas.

For example, although the closure part 17 of the tail pipe 14 has the inclination portion 17a inclined with respect to the front-rear direction and the vehicle width direction of the vehicle body 2 in the above embodiments, the closure part 17 may not be particularly provided with the inclination portion 17a and may be a simple circular plate structure.

Although the tail pipe 14 is provided with two first exhaust ports 18 and two second exhaust ports 19 in the above embodiments, the number of the first exhaust ports 18 and the number of the second exhaust ports 19 are not particularly limited and both may be one. Further, the number and shape of the first exhaust port 18 and the number and shape of the second exhaust port 19 may be different.

Further, although the exhaust gas purification device 8 has the DPF 10 for removing the particulate matter contained in the exhaust gas discharged from the engine 5 in the above embodiments, the present disclosure can be applied to a forklift that is not equipped with a DPF as long as the exhaust temperature of the exhaust gas becomes high. Further, although the engine 5 is a diesel engine in the above embodiments, the present disclosure can be applied to, for example, a forklift equipped with a gasoline engine as long as the exhaust temperature of the exhaust gas becomes high.

Further, although the forklift 1 provided with a cargo handling device is exemplified as the industrial vehicle in the above embodiments, the present disclosure can be applied to an industrial vehicle as long as the industrial vehicle includes the counterweight, the radiator, the radiator fan, and the exhaust pipe and the exhaust temperature of the exhaust gas flowing in the exhaust pipe rises.

REFERENCE SIGNS LIST 1, 1A Forklift (industrial vehicle)
2 Vehicle body
4 Counterweight
5 Engine
6 Radiator
7 Radiator fan
7a Blade
7b Central portion
11 Downstream exhaust pipe (exhaust pipe)
14 Tail pipe
14a Circumferential surface portion
17 Closure part
17a Inclination portion
18 First exhaust port
19 Second exhaust port
20 Throttling part
21 Plate-shaped member
21a Inclination part
41 First pipe
42 Second pipe
43 Fitting part
44 Throttling part

The invention claimed is:

1. An industrial vehicle comprising:
a counterweight located at a rear portion of a vehicle body;
a radiator disposed in front of the counterweight;
a radiator fan configured to generate cooling air flowing behind the vehicle body; and
an exhaust pipe disposed inside the counterweight to release exhaust gas from an engine into the atmosphere,
wherein the exhaust pipe has a tail pipe extending in a vehicle width direction of the vehicle body,
wherein a closure part configured to close an opening of the tail pipe is provided at a tip end portion of the tail pipe,
wherein a first exhaust port configured to discharge the exhaust gas rearward from the vehicle body and a second exhaust port configured to discharge the exhaust gas rearward from the vehicle body at a tip end side of the tail pipe with respect to the first exhaust port are provided in a circumferential surface portion of the tail pipe,
wherein the first exhaust port and the second exhaust port are disposed in a region where the cooling air flows, and
wherein a throttling part configured to change a flow path area for the exhaust gas is disposed between the first exhaust port and the second exhaust port in the tail pipe,
wherein the throttling part is formed of a plate-shaped member having substantially a U shape which is fixed to the tail pipe, and
wherein the plate-shaped member of the throttling part has an inclination part inclined with respect to a front-rear direction and a vehicle width direction of the vehicle body on a side of the second exhaust port, and
wherein the closure part has an inclination portion inclined with respect to the front-rear direction and the vehicle width direction of the vehicle body so as to taper from a side opposite to the first exhaust port and the second exhaust port toward a side of the first exhaust port and the second exhaust port.

2. The industrial vehicle according to claim 1, wherein the throttling part is disposed on the side of the first exhaust port and the second exhaust port in the tail pipe.

3. The industrial vehicle according to claim 1,
wherein the tail pipe has a first pipe having the first exhaust port and a second pipe having the second exhaust port,
wherein one end portion of one of the first pipe and the second pipe is provided with a fitting part configured to fit the other of the first pipe and the second pipe, and
wherein the throttling part is integrated with the fitting part.

4. The industrial vehicle according to claim 1, wherein the first exhaust port and the second exhaust port are disposed to avoid a position corresponding to a central portion of the radiator fan in the region where the cooling air flows.

5. The industrial vehicle according to claim 1, wherein the inclination portion of the throttling part and the inclination portion of the closure part are substantially parallel to each other.

* * * * *